United States Patent [19]

Arai

[11] 4,212,473
[45] Jul. 15, 1980

[54] MULTIPLE SEAL RING HAVING A TAPERED SURFACE, AND A SEALING DEVICE

[76] Inventor: Yoshio Arai, 1400 Kamihongo, Matsudo-shi, Chiba-ken, Japan

[21] Appl. No.: 16,736

[22] Filed: Mar. 2, 1979

[30] Foreign Application Priority Data

Jun. 21, 1978 [JP] Japan ................................. 53-74963

[51] Int. Cl.³ .............................................. F16J 15/34
[52] U.S. Cl. ............................... 277/81 P; 277/81 S; 277/115; 277/119; 277/144; 277/166; 277/171; 277/190; 277/193
[58] Field of Search ................ 277/115, 116, 119–122, 277/144, 145, 154, 166, 171, 172, 190, 191, 193, 199, 81 P, 81 R, 81 S

[56] References Cited

U.S. PATENT DOCUMENTS

| | | | |
|---|---|---|---|
| 2,444,249 | 6/1948 | Estey | 277/115 X |
| 4,080,120 | 3/1978 | Eiermann | 277/81 P X |

FOREIGN PATENT DOCUMENTS

| | | | |
|---|---|---|---|
| 645370 | 6/1928 | France | 277/115 |
| 10498 | of 1915 | United Kingdom | 277/115 |

*Primary Examiner*—Robert S. Ward, Jr.
*Attorney, Agent, or Firm*—Haseltine, Lake & Waters

[57] ABSTRACT

A sealing device especially designed for sealing between the opposed flat surfaces of a stationary member and a rotary member. The device comprises a multiple seal ring composed of a plurality of annular seal elements of different diameter which are received in an annular groove formed in the rotary member. The seal elements each have a flat sealing face formed at one end for sealing contact with said flat surface of said stationary member and a conical sealing face formed at the other end for sealing contact with a conical bottom surface of the groove, the conical sealing face diverging in a radially outward direction toward the flat sealing face. The seal elements are each cut radially so as to provide themselves with a radially outwardly expanding force and closely fitted one over the other in a concentric relation with the radial cut portions of the respective seal elements being circumferentially displaced from one another for sealing the cut portions of the seal elements. The seal elements in use are caused under the action of their own expanding force to slide along the conical bottom surface of the groove so as to urge their flat and conical sealing faces into intimate sealing contact with the flat surface of the stationary member and the conical bottom surface of the groove. With the above construction, the seal between the flat surfaces of the stationary and rotary members is effected solely by the multiple seal ring without employing any additional means such as springs, O-rings, or the like and hence the sealing device is extremely simple in construction and highly durable.

6 Claims, 8 Drawing Figures

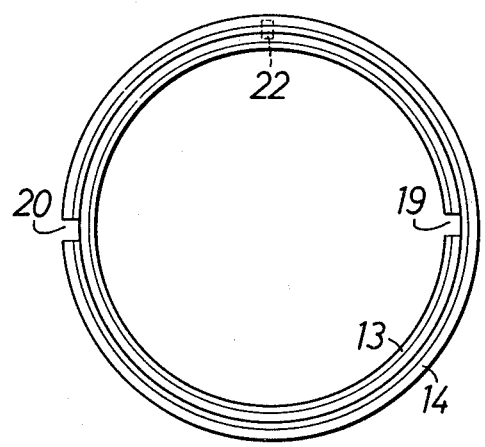
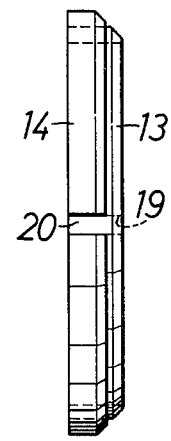
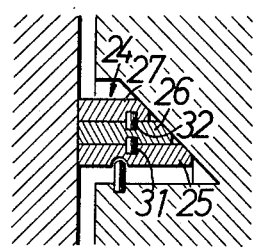
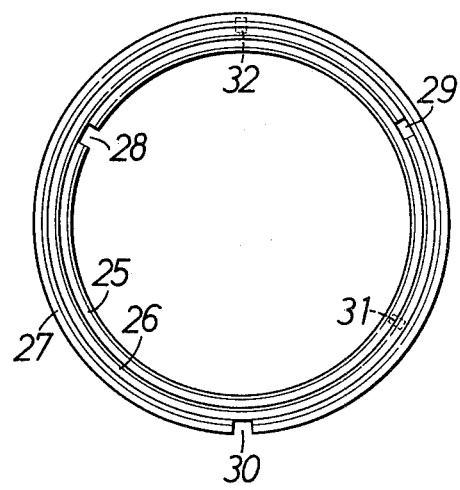

MULTIPLE SEAL RING HAVING A TAPERED SURFACE, AND A SEALING DEVICE

BACKGROUND OF THE INVENTION

The present invention broadly relates to a seal between opposing flat surfaces of two members which make a relative movement to each other and, more particularly, to a multiple annular seal ring composed of a plurality of concentrically tiered seal elements, said seal ring having a tapered surface and adapted to be received in an annular groove having a tapered bottom surface formed in either one of these members, as well as to a sealing device incorporating the multiple annular seal ring.

Generally speaking, the seal between the inner peripheral surface of cylinder and the outer peripheral surface of the piston of internal combustion engine is performed by annular seal rings called piston rings which are cut at their intermediate portions. These piston rings, thanks to the provision of the cut portions, exhibit radial expanding force. This radial expanding force acts to press the outer peripheral surface of the piston ring against the inner peripheral surface of the cylinder so as to enable the piston ring to form a good seal between the inner peripheral surface of the cylinder and the outer peripheral surface of the piston.

This advantage of the conventional piston ring i.e. the radial expansion of the ring however, cannot be utilized in the seal between the inner side surface of the housing and the side surface of the rotor of rotary-piston type internal combustion engine.

It has been a conventional measure, therefore, for obtaining the required sealing force between the side surfaces of the rotor and housing, to press a seal ring which itself has no expanding force, against the sealing surface, by means of springs or the like resilient means disposed behind the seal ring.

More specifically, as will be seen from FIG. 1 showing a typical example of conventional sealing arrangement, a seal ring 1 adapted to make a seal between the side surface R of the rotor and the side surface H of the housing is resiliently pressed by springs 2 against the surface H of the housing. In order to ensure a sufficient sealing effect at the sealing faces of the seal ring 1, gaps h and h' are left between the radially inner and outer surfaces, and the opposing walls of the annular groove G for receiving the seal ring 1. As a result, lubricating oil is allowed to leak from the radially inner portion of the rotor to the peripheral portion of the rotor, through these gaps and the clearance behind the seal ring 1 where the springs 2 are disposed.

Various counter-measures have been taken to avoid such a leakage of lubricating oil. For instance, it has been proposed to form a groove 3 in the seal ring 1 itself, so as to receive an "O" ring 4 adapted to make a seal between the rotor and the seal ring itself, as shown in FIG. 1. It has been also practiced to use an oil seal 6, in place of the "O" ring 4, as shown in FIG. 2.

These conventional sealing arrangement, however, have following disadvantages. Namely, the seal ring 1 which operates under severe condition of high temperature and pressure, is always made to move in the groove G toward one side of the groove G, as the rotor makes a complicated eccentric rotary movement. As a result, the above mentioned gaps h and h' are made to change, to nullify the above-explained sealing effect. Therefore, the seal ring 1 fails to perform the sealing function to allow the lubricating oil around the crank shaft, gears and the like at the center of the rotor to leak into the combustion chamber partly defined by the outer peripheral surface of the rotor, through the gaps h, h' and the clearance behind the seal ring 1.

Further, the combustion gas of a high pressure is allowed to leak from the combustion chamber to the low-pressure side, through these gaps and clearance.

These leaks of lubricating oil and combustion gas inconveniently lower the performance of the rotary-piston type internal combustion engine and, further, poses various problems such as deterioration of combustion resulting in uneconomically large rate of fuel consumption and increased emission of noxious components to the atmosphere.

SUMMARY OF THE INVENTION

Under these circumstances, the present invention aims at fundamentally overcoming the above stated problem of the prior art.

Thus, it is an object of the invention to provide a multiple seal ring and a sealing device for making a seal between two opposing flat surfaces of two members which make a relative movement to each other, in which the seal is performed solely by a multiple seal ring composed of a plurality of annular seal elements without employing any additional means such as springs, O-rings or the like, each of the seal elements being provided with a tapered annular sealing face and received in an annular groove which has a tapered annular bottom surface and formed in either one of the opposing flat surfaces.

It is another object of the invention to provide a multiple seal ring composed of a plurality of annular seal elements having an annular tapered sealing face and a sealing device incorporating the same, which are simple in construction, easy to produce and capable of effectively and positively preventing leakage of combustion gas, lubricating oil, or the like passing through the cut portions formed in the respective seal elements.

To this end, the seal elements are each cut merely in a radial direction and closely fitted one over the other in concentric relation with each other with their cut portions being circumferentially displaced from each other.

Other objects, features and advantages of the present invention will become apparent from the ensuing description, when read in conjunction with the accompanying drawings, which illustrate a few presently preferred embodiments of the invention.

BRIEF DESCRIPTION OF THE DRAWINGS

FIG. 5 is a side elevational view of the multiple seal ring as shown in FIG. 3;

FIG. 6 is a front view of the multiple seal ring as shown in FIG. 3;

FIG. 7 is a front view of a modified form of multiple seal ring constructed in accordance with the invention; and FIG. 8 is a partial side elevational view of the multiple seal ring as shown in FIG. 7.

DESCRIPTION OF THE PREFERRED EMBODIMENTS

Hereinafter, the invention will be more fully described through a few presently preferred embodiments in which the multiple seal ring and the sealing device of the invention are used in making a seal between the side surface of the housing and the side surface of the rotor of a rotary-piston type internal combustion engine.

Figure 1:
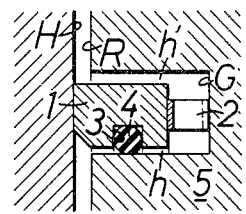
FIGS. 1 and 2 are sectional side-elevational views of conventional sealing devices.
Figure 2:
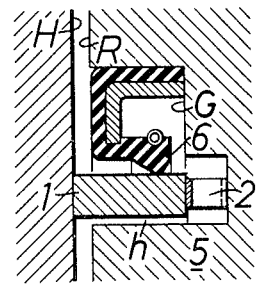
Figure 4:
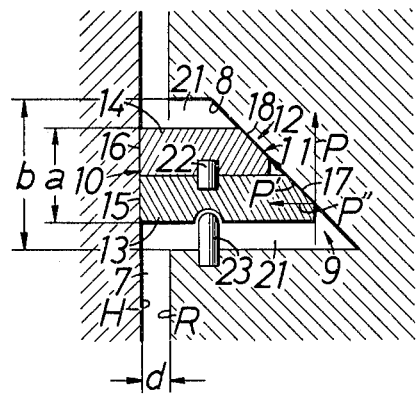
FIG. 4 is an enlarged view of a portion of the sealing device as shown in FIG. 3.
Figure 3:
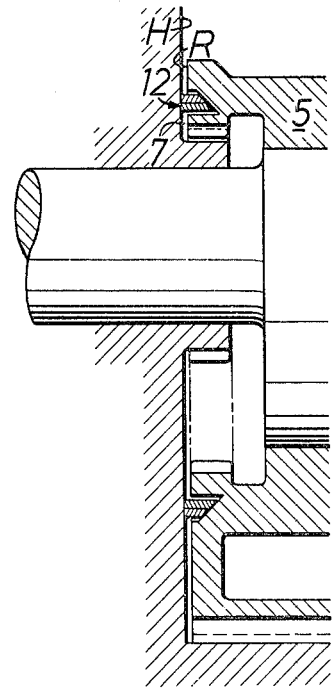
FIG. 3 is a sectional side-elevational view of a sealing device constructed in accordance with the invention.

Referring to FIGS. 3 and 4, there are shown a side surface H of the housing and a side surface R of the rotor 5 of a rotary-piston type internal combustion engine. A sealing device embodying the invention is disposed in a small gap formed between these two side surfaces H and R. The sealing device has a multiple seal ring 12 provided at its one axial end with a flat sealing surface 10 and, at its other axial end, with an annular male tapered sealing surface 11, which is received by an annular groove 9 formed in the rotor side surface R and provided with an annular female tapered bottom surface 8.

The flat sealing surface 10 and the tapered sealing surface 11 are kept in contact with the side surface H of the housing and the female tapered bottom surface 8 of the annular groove 9, respectively, thereby to provide a gas-tight seal between the radially inner and outer sides of the seal ring 12.

Explanation is now made of the construction of the multiple seal ring 12 formed in accordance with a first embodiment of the invention. As shown in FIGS. 3 through 6, the multiple seal ring 12 is made up of inner and outer annular seal elements 13, 14, which are closely fitted one over the other in concentric relation with each other. The seal elements 13, 14 are each provided at their one axial end with an annular flat sealing surface 15, 16 and at their other axial end with a conical male tapered surface 17, 18 diverging in the radial direction toward the flat sealing surfaces 15, 16. The flat sealing surfaces 15, 16 of the inner and outer annular seal elements 13, 14 jointly form one flat sealing surface 10 of the multiple seal ring 12 and the conical male tapered surfaces 17, 18 thereof jointly form a male tapered surface 11 of the multiple seal ring 12. The conical male tapered surfaces 17, 18 are inclined at an angle of, for example, 45° to the flat sealing surfaces 15, 16.

The inner and outer annular seal elements 13, 14 are radially cut so as to be imparted a radial expanding or tensile force and for the purpose of preventing the leakage of lubricating oil, combustion gas, and the like from the radial cut portions 19, 20 formed in respective seal elements 13, 14, the outer peripheral surface of the inner seal element 13 is in intimate contact under tension with the inner peripheral surface of the outer seal element 14 with the radial cut portion 19 of the inner seal element 13 being arranged circumferentially 180° out of phase against the radial cut portion 20 of the outer seal element 14.

Referring now to the annular groove 9 formed in the side surface R of the rotor and adapted for receiving the multiple seal ring 12, the radial breadth b of this annular groove 9 is selected to be greater than the radial width a of the multiple seal ring 12, so that the multiple seal ring 12 as a whole may move in the annular groove 9, keeping the sealing contact at its opposite ends with the side surface H of the housing and the bottom of the groove 9, as the distance between the side surfaces H and R of the housing and rotor is changed. The bottom surface of the annular groove 9 is formed as a female tapered surface 8 which expands radially outwardly toward the side surface R of the rotor. The female tapered surface 8 forms an angle of, for example, 45° to the side surface R of the rotor.

In use, the multiple seal ring 12 is fitted into the annular groove 9 so as to divide the space between the housing surface H and the rotor surface R into two separate portions as shown in FIGS. 3 and 4. As a result, the flat sealing surfaces 15, 16 of the inner and outer annular seal elements 13, 14 jointly make a sliding and sealing contact with the side surface H of the housing, while the male tapered surfaces 17, 18 of the seal elements 13, 14 jointly make a sliding and sealing contact with the female tapered surface 8 of the annular groove 9, as the rotor rotates relative to the housing.

The total radial expanding force P of the multiple seal ring 12 then produces a component P' of force which acts to make the multiple seal ring 12 slide along the female tapered surface 8. This component P' in turn produces a component P'' which tends to press the multiple seal ring 12 axially against the side surface H of the housing.

Therefore, by providing radial clearances 21 between the multiple seal ring 12 and the walls of the annular groove 9, so as to accommodate the radial displacement of the inner and outer seal elements 13, 14, as shown in FIG. 4, the flat sealing surfaces 15, 16 and the male tapered sealing surfaces 17,18 of the seal elements 13, 14 are automatically pressed into sealing contact with the side surface H of the housing and the female tapered surface 8 of the annular groove 9.

Consequently, a good seal is formed between the side surfaces H, R of the housing and rotor, at each axial end of the multiple seal ring 12, i.e. at the flat sealing surface 10 and the male tapered surface 11. This sealing effect is never deteriorated, even when the distance d between the side surfaces H and R is changed, because the seal elements 13, 14 slide along the female tapered surface 8, so as to accommodate such a change of distance d. In addition, various centrifugal forces applied to the inner and outer seal elements 13, 14 due to the eccentric rotation of the rotor 5 enhances the pressure at which the seal elements 13, 14 contact the female tapered surface 8 of the annular groove 9, which in turn increases the contact pressure of the seal elements 13, 14 on the side surface H of the housing, thereby to further improve the sealing effect.

As shown in FIG. 4, the inner and outer seal elements 13, 14 are held against relative rotation by means of an anti-rotation pin 22 so that the radial cut portions 19, 20 of the inner and outer seal elements 13, 14 can be prevented from circumferential movement relative to each other and hence from registration with each other. Either one or both of the inner and outer seal elements 13, 14 is fixed to the rotor 5 by an anti-rotation pin 23 against rotation so as to prevent rotation of the multiple seal ring 12 relative to the rotor 5.

FIGS. 7 and 8 illustrate a modified form of the multiple seal ring constructed in accordance with the present invention. In this modification, the multiple seal ring 24 is made up of the inner, intermediate and outer annular seal elements 25, 26 and 27 which are concentrically fitted one over the other with the outer and inner peripheral surfaces of the mutually adjacent seal elements being in intimate contact with one another. These seal elements 25, 26 and 27 are respectively cut in a radial direction to form radial cut portions 28, 29 and 30, which are arranged circumferentially out of phase at an angle of 120° relative to one another. Further, the relative rotation of the seal elements 25, 26 and 27 is prevented by anti-rotation pins 31, 32 which are respectively disposed between the elements 25 and 26, and between the elements 26 and 27. The structure of other parts of this embodiment is just the same as the of the aforementioned first embodiment.

The multiple seal ring of the present invention is not limited to the aforementioned embodiments and may be made up of four or more annular seal elements each of which are relatively thin in radial thickness and cut in a radial direction. In this case, it is preferable to arrange these seal elements such that the cut portions of the seal elements are disposed in circumferentially equi-spaced relation with each other.

Although the invention has been described with specific reference to an embodiment applied to a seal between the rotor and the housing of a rotary-piston type internal combustion engine, it will be clear to those skilled in the art that the sealing device of the invention can be applied broadly to the end-surface sealing of various machines such as rotary compressor, rotary pump and the like, and to other general end-surface sealing purposes.

Not only metals such as cast iron but also various materials such as ceramics, synthetic rubbers, carbon, plastics and so forth can effectively used as the material for the seal elements.

Preferably, various conventional surface treatments are effected on the sealing surfaces of the seal elements of the invention, in order to improve anti-scuffing, anti-seizure and wear-resistant properties, as well as to enhance the running-in characteristic, anti-corrosion effect and oil-holding nature of the multiple seal ring, as in the conventional piston ring.

As has been described, according to the invention, an effective and reliable seal is formed between the radially outer part and the radially inner part of the space formed between opposing surfaces of two relatively moving members, by a multiple seal ring having an inclined axial end surface. It is remarkable that this superior sealing effect is provided solely by the multiple seal ring having a tapered end surface, so that "O" ring or the like assisting means is completely eliminated. This in turn ensures a simplified construction and easier handling of the sealing device, as well as improved durability which promises the excellent sealing effect to be maintained for longer period of time.

Further, since two or more annular seal elements of different diameter are simply cut in a radial direction and closely fitted one over the other in concentric relation with each other with the cut portions of the seal elements being circumferentially displaced from each other, it is easier and less expensive to produce such seal elements in comparison with the case in which the seal ring is formed of a single seal element and cut in stepwise fashion to form complicated cut surfaces for sealing purposes. In addition, the leak passage of fluid leaking from the outside to the inside or from the inside to the outside of the seal ring through the cut portions thereof is materially lengthened to thereby highly enhance the sealing capacity.

It is possible to make the radial thickness of each seal element as thin as required without reducing the total areas of opposite sealing surfaces of the entire seal ring, whereby each seal element readily deforms its shape as it displaces radially outwardly within an annular groove under its own radial expanding force, so that the inner peripheral surface of an outer one of the seal elements can be brought into a much more intimate contact with the outer peripheral surface of the neighboring inner seal element for improved sealability.

While a few preferred embodiments of the present invention has been shown and described, it will be apparent to those skilled in the art that various changes and modifications may be made therein without departing from the spirit of the invention or from the scope of the appended claims.

What is claimed is:

1. A multiple seal ring for sealing between a stationary flat surface and a rotary flat surface and adapted to be received in an annular groove formed in the rotary surface, said seal ring comprising a plurality of annular seal elements of different diameter each having a flat sealing face formed at one end for making sealing contact with said stationary flat surface and a conical sealing face formed at the other end for making sealing contact with a conical bottom surface of said annular groove, said conical sealing face diverging in a radially outward direction toward said flat sealing face, each of said seal elements being cut in a radial direction so as to afford itself a radially outwardly expanding force, said seal elements being closely fitted one over the other in concentric relation with each other with the cut portions of said seal elements being circumferentially displaced from each other, whereby said seal elements are slidable under the action of their own expanding force along said conical bottom surface of said groove to thereby urge the mutually adjacent inner and outer peripheral surfaces of said seal elements into intimate contact with each other for sealing said cut portions of said seal elements.

2. A multiple seal ring as claimed in claim 1, comprising anti-rotation means for preventing relative rotation of said seal elements.

3. A multiple seal ring as claimed in claim 1, wherein said cut portions of said seal elements are disposed in circumferentially equi-spaced relation from each other.

4. A sealing device for sealing between a stationary member and a rotary member having a pair of opposed flat surfaces, said sealing device comprising an annular groove formed in said rotary member and having a conical bottom surface diverging in a radially outward direction toward said flat surface of said rotary member, and a seal ring received in said annular groove, said seal ring composed of a plurality of annular seal elements of different diameter each having a flat sealing face formed at one end in sealing contact with said flat surface of said stationary member and a conical sealing face formed at the other end in sealing contact with the conical bottom surface of said annular groove, each of said seal elements being cut in a radial direction so as to afford itself a radially outwardly expanding force, said seal elements being closely fitted one over the other in concentric relation with each other with the cut portions of said seal elements being circumferentially displaced from each other, the total radial thickness of said seal elements as a whole being less than the radial width of said groove, said seal elements being slidable under the action of their own radial expanding force along the conical bottom surface of said annular groove in a radially outward direction to thereby urge the mutually adjacent inner and outer peripheral surfaces of said seal elements into intimate contact with each other for sealing said cut portions of said seal elements.

5. A sealing device as claimed in claim 4, comprising anti-rotation means for holding said seal elements against rotation relative to each other and to said rotary member.

6. A sealing device as claimed in claim 4, wherein said cut portions of said seal elements are disposed in circumferentially equi-spaced relation from each other.

* * * * *